United States Patent
Sheth et al.

(10) Patent No.: US 9,942,846 B2
(45) Date of Patent: Apr. 10, 2018

(54) DELAYING RADIO LINK CONTROL RETRANSMISSIONS

(71) Applicant: QUALCOMM Incorporated, San Diego, CA (US)

(72) Inventors: Amisha Sheth, San Diego, CA (US); Vasanth Kumar Ramkumar, San Diego, CA (US); Srinivasan Rajagopalan, San Diego, CA (US); Gang Andy Xiao, San Diego, CA (US); Deepak Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 328 days.

(21) Appl. No.: 14/551,628

(22) Filed: Nov. 24, 2014

(65) Prior Publication Data
US 2015/0163741 A1 Jun. 11, 2015

Related U.S. Application Data

(60) Provisional application No. 61/912,047, filed on Dec. 5, 2013.

(51) Int. Cl.
*H04W 52/02* (2009.01)
*H04L 1/18* (2006.01)

(52) U.S. Cl.
CPC ......... *H04W 52/0222* (2013.01); *H04L 1/188* (2013.01); *H04L 1/1887* (2013.01);
(Continued)

(58) Field of Classification Search
CPC ...... H04L 1/188; H04W 52/02; H04W 76/048
See application file for complete search history.

(56) References Cited

U.S. PATENT DOCUMENTS

| 8,290,428 B2 | 10/2012 | Ho et al. |
| 2007/0268861 A1* | 11/2007 | Diachina ............... H04L 1/1838 370/329 |

(Continued)

FOREIGN PATENT DOCUMENTS

EP  2621242 A1  7/2013

OTHER PUBLICATIONS

Email Rapporteur (CMCC): "Email summary on inter-band TDD CA", 3GPP Draft; R1-122708_Email Summary Inter-Band TDD CA, 3rd Generation Partnership Project (3GPP), Mobile Competence Centre; 650, Route Des Lucioles; F-06921 Sophia-Antipolis Cedex; France, vol. RAN WG1, no. Prague, Czech Republic; May 21, 2012-May 25, 2012, May 25, 2012 (May 25, 2012), XP050601167, [retrieved on May 25, 2012].

(Continued)

*Primary Examiner* — Xavier Szewai Wong
(74) *Attorney, Agent, or Firm* — Patterson & Sheridan, L.L.P.

(57) ABSTRACT

Certain aspects of the present disclosure relate to techniques and apparatus for a user equipment (UE) to delay RLC retransmissions (e.g., during off-durations, including CDRX off-durations). According to aspects of the present disclosure, a UE may delay triggering an RLC retransmission of an RLC PDU until after a next opportunity for the UE to receive an RLC ACK of the RLC PDU. By delaying RLC retransmissions, a UE may be prevented from waking up from one or more CDRX off-durations and using power associated with waking up from the one or more CDRX off-durations.

28 Claims, 11 Drawing Sheets

(52) U.S. Cl.
CPC .......... *Y02D 70/00* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/164* (2018.01); *Y02D 70/24* (2018.01)

(56) References Cited

U.S. PATENT DOCUMENTS

| | | | |
|---|---|---|---|
| 2007/0286080 A1* | 12/2007 | Kim | H04W 52/0235 370/236 |
| 2010/0034095 A1 | 2/2010 | Ho et al. | |
| 2010/0037114 A1 | 2/2010 | Huang et al. | |
| 2012/0163161 A1* | 6/2012 | Zhang | H04L 1/1874 370/216 |
| 2013/0021982 A1 | 1/2013 | Kim et al. | |
| 2013/0201884 A1 | 8/2013 | Freda et al. | |
| 2013/0223307 A1* | 8/2013 | Ohlsson | H04W 52/0216 370/311 |
| 2014/0078941 A1 | 3/2014 | Seo et al. | |

OTHER PUBLICATIONS

Huawei et al., "Backward compatibility for TDD eiMTA", 3GPP Draft; R1-132875, 3rd Generation Partnership Project (3GPP), Mobile Competence Centre ; 650, Route Des Lucioles ; F-06921 Sophia-Antipolis Cedex; France, vol. RAN WG1, no. Barcelona, Spain; Aug. 19, 2013-Aug. 23, 2013, Aug. 10, 2013 (Aug. 10, 2013), XP050716119, Retrieved from the Internet: URL:http://www.3gpp.org/ftp/tsg_ran/WG1_RL1/TSGR1_74/Docs/ [retrieved on Aug. 10, 2013].

International Search Report and Written Opinion—PCT/US2014/067319—ISA/EPO—dated Mar. 11, 2015.

ZTE: "Reference configuration in TDD-eiMTA HARQ timing", 3GPP Draft; R1-134315 Reference Configuration in TDD eiMTA HARQ Timing, 3rd Generation Partnership Project (3GPP), Mobile Competence Centre; 650, Route Des Lucioles; F-06921 Sophia-Antipolis Cedex; vol. RAN WG1, no. Guangzhou, China; Oct. 7, 2013-Oct. 11, 2013, Sep. 28, 2013 (Sep. 28, 2013), XP050717459, Retrieved from the Internet: URL:http://www.3gpp.org/ftp/tsg_ran/WG1_RL1/TSGR1_74b/Docs/ [retrieved on Sep. 28, 2013].

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 7

DELAYING RADIO LINK CONTROL RETRANSMISSIONS

CROSS-REFERENCE TO RELATED APPLICATIONS

The present application for patent claims priority to U.S. Provisional Application No. 61/912,047, filed Dec. 5, 2013, which is assigned to the assignee of the present application and hereby expressly incorporated by reference herein in its entirety.

BACKGROUND

Field of the Disclosure

The present disclosure relates generally to wireless communication, and more particularly, to methods and apparatus for delaying radio link control (RLC) uplink (UL) retransmissions (e.g., during connected discontinuous reception (CDRX) off-durations).

Description of the Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

Certain aspects of the present disclosure provide a method for wireless communications by a user equipment (UE). The method generally includes transmitting a radio link control (RLC) protocol data unit (PDU), receiving at least one of a hybrid automatic retransmission request (HARQ) acknowledgment (ACK) of the PDU or a time division duplex (TDD) uplink/downlink (UL/DL) subframe configuration, determining that an RLC retransmission timer will expire or has expired before a next opportunity for the UE to receive an RLC ACK of the PDU, and delaying an RLC retransmission of the PDU in response to the determination.

Certain aspects of the present disclosure provide an apparatus for wireless communications. The apparatus generally includes a processor configured to transmit an RLC PDU, receive at least one of a HARQ ACK of the PDU or a TDD UL/DL subframe configuration, determine that an RLC retransmission timer will expire or has expired before a next opportunity for the apparatus to receive an RLC ACK of the PDU, and delay an RLC retransmission of the PDU in response to the determination. The apparatus also includes a memory coupled to the processor.

Certain aspects of the present disclosure provide an apparatus for wireless communications. The apparatus generally includes means for transmitting an RLC PDU, means for receiving at least one of a HARQ ACK of the PDU or a TDD UL/DL subframe configuration, means for determining that an RLC retransmission timer will expire or has expired before a next opportunity for the apparatus to receive an RLC ACK of the PDU, and means for delaying an RLC retransmission of the PDU in response to the determination.

Certain aspects of the present disclosure provide a computer readable medium storing computer executable code for wireless communications. The computer executable code generally includes code for transmitting an RLC PDU, code for receiving at least one of a HARQ ACK of the PDU or a TDD UL/DL subframe configuration, code for determining that an RLC retransmission timer will expire or has expired before a next opportunity to receive an RLC ACK of the PDU, and code for delaying an RLC retransmission of the PDU in response to the determination.

Aspects generally include methods, apparatus, systems, computer program products, and processing systems, as substantially described herein with reference to and as illustrated by the accompanying drawings.

BRIEF DESCRIPTION OF THE DRAWINGS

FIG. 7 illustrates an exemplary list of uplink/downlink subframe configurations.

DETAILED DESCRIPTION

Figure 1:
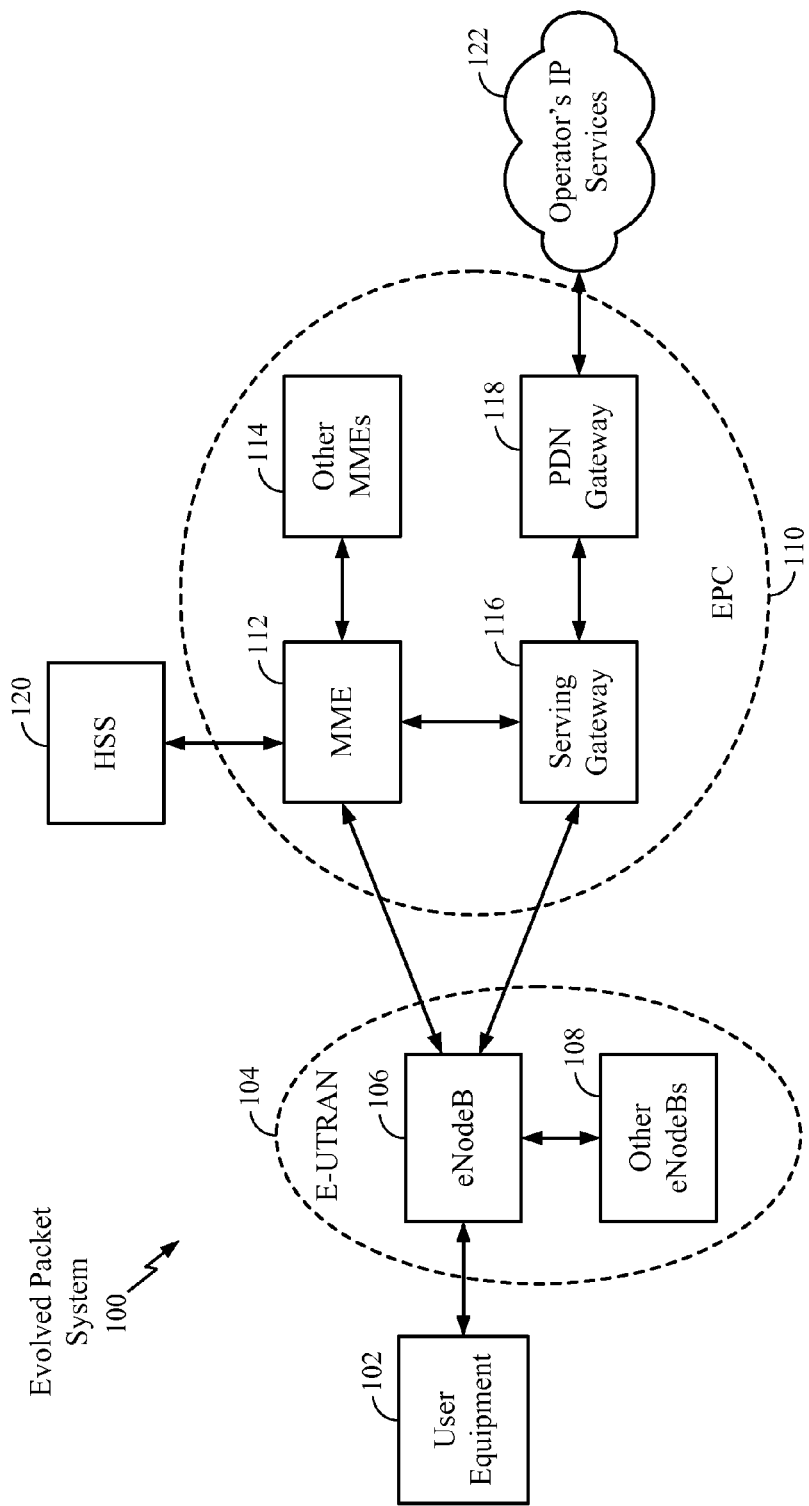
FIG. 1 is a diagram illustrating an example of a network architecture.

In current wireless technologies (e.g., LTE Rel-8), information to be transmitted by a device may be passed from a higher protocol layer down through lower protocol layers to a physical layer (PHY) that transmits the information. Similarly, information to be received by a device may be received at a physical layer and passed up through higher protocol layers. Media access control (MAC), radio link control (RLC), and packet data convergence protocol (PDCP) are examples of protocol layers. When a user equipment (UE) sends an uplink (UL) transmission to a serving network, the UE may retransmit the transmission if the UE either does not receive an acknowledgment (ACK) or receives a negative acknowledgment (NAK) for the transmission. These retransmissions may be triggered at particular protocol layers.

UL RLC retransmissions are triggered at a UE when the serving network does not send an ACK/NAK for a UL protocol data unit (PDU) before the expiration of a T-poll retransmit timer that the UE starts when the UE completes transmission of the UL PDU. However, a UE may be configured to perform connected discontinuous reception (CDRX), wherein the UE's receiver (e.g., a transceiver) is periodically switched on and off. Times when the receiver is off may be referred to as off-durations, and times when it is on may be referred to as on-durations. If the CDRX cycle length is longer than the UE's T-poll retransmit timer length, then the T-poll retransmit timer will expire before the UE switches its receiver on for the next on-duration. Because the radio link controller of the UE is typically unaware of CDRX cycles, RLC retransmissions can be triggered at the UE's radio link controller (e.g., by the expiration of the T-poll retransmit timer) before the network attempts to send an RLC ACK. The triggering of the RLC retransmissions can cause the UE to wake up (e.g., activate one or more radio components) out of one or more CDRX off-durations. This leads to unnecessary power consumption by the UE and negatively impacts battery performance of the UE. When a UE operating in a CDRX mode transmits a UL PDU and cycles to an off-duration before the network transmits an RLC ACK of that UL PDU, then the network can ideally schedule the RLC ACK for that PDU only at the beginning of a next on-duration of the CDRX cycle. This is because an RLC ACK transmitted during an off-duration cannot be received by the UE, due to the UE's receiver being off.

According to aspects of the present disclosure, a UE may delay triggering an RLC retransmission of an RLC PDU until after a next opportunity for the UE to receive an RLC ACK of the RLC PDU. By delaying RLC retransmissions, a UE may be prevented from waking up from one or more CDRX off-durations and using power associated with waking up from the one or more CDRX off-durations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, PCM (phase change memory), flash memory, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100 in which aspects of the present disclosure may be practiced. For example, the UE 102 may be configured to delay UL RLC retransmissions as described below with reference to FIG. 10 and FIG. 11.

The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. Exemplary other access networks may include an IP Multimedia Subsystem (IMS) PDN, Internet PDN, Administrative PDN (e.g., Provisioning PDN), carrier-specific PDN, operator-specific PDN, and/or GPS PDN. "LTE" refers generally to LTE and LTE-Advanced (LTE-A). As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), an access point, or some other suitable terminology. The eNB 106 may provide an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a netbook, a smart book, an ultrabook, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include, for example, the Internet, the Intranet, an IP Multimedia Subsystem (IMS), and a PS (packet-switched) Streaming Service (PSS). In this manner, the UE102 may be coupled to the PDN through the LTE network.

Figure 2:
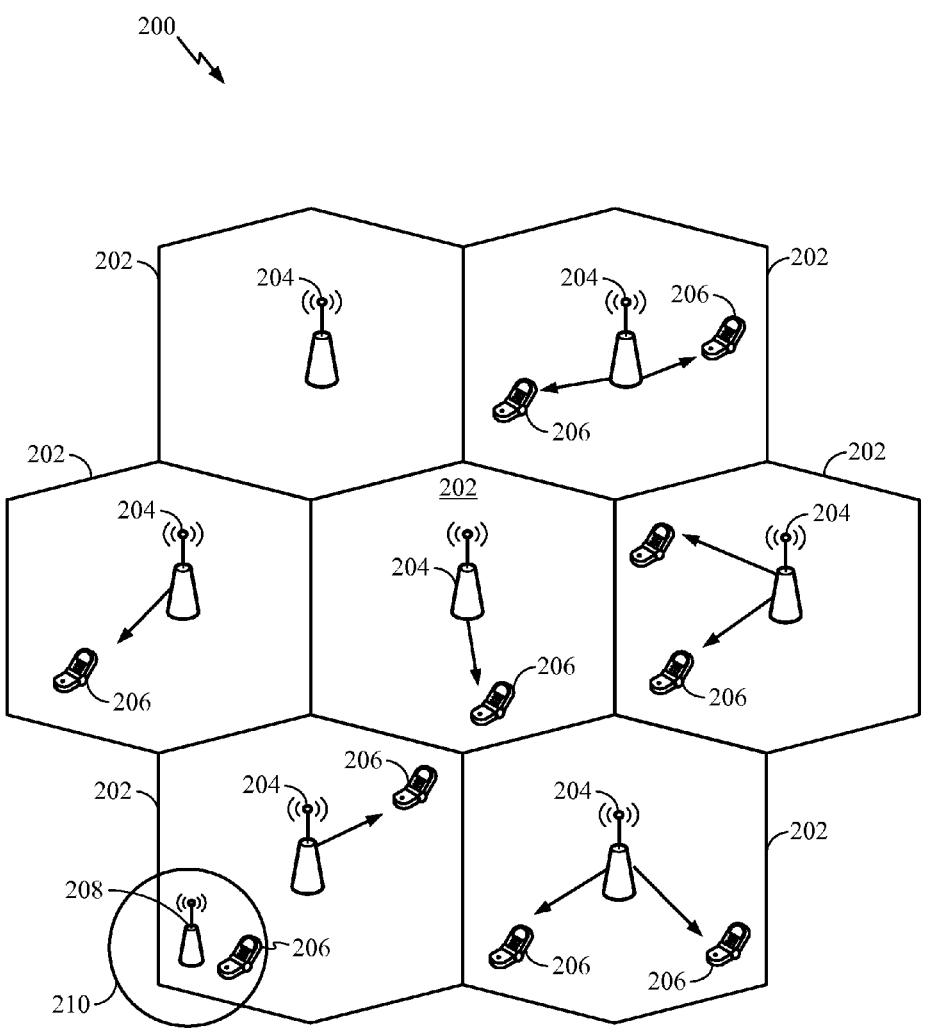
FIG. 2 is a diagram illustrating an example of an access network.

FIG. 2 is a diagram illustrating an example of an access network 200 in an LTE network architecture. Aspects of the present disclosure may be practiced in the exemplary access network 200. For example, one or more of the UEs 206 may be configured to delay UL RLC retransmissions, as described below with reference to FIG. 10 and FIG. 11.

In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. The network 200 may also include one or more relays (not shown). According to one application, a UE may serve as a relay.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employ CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
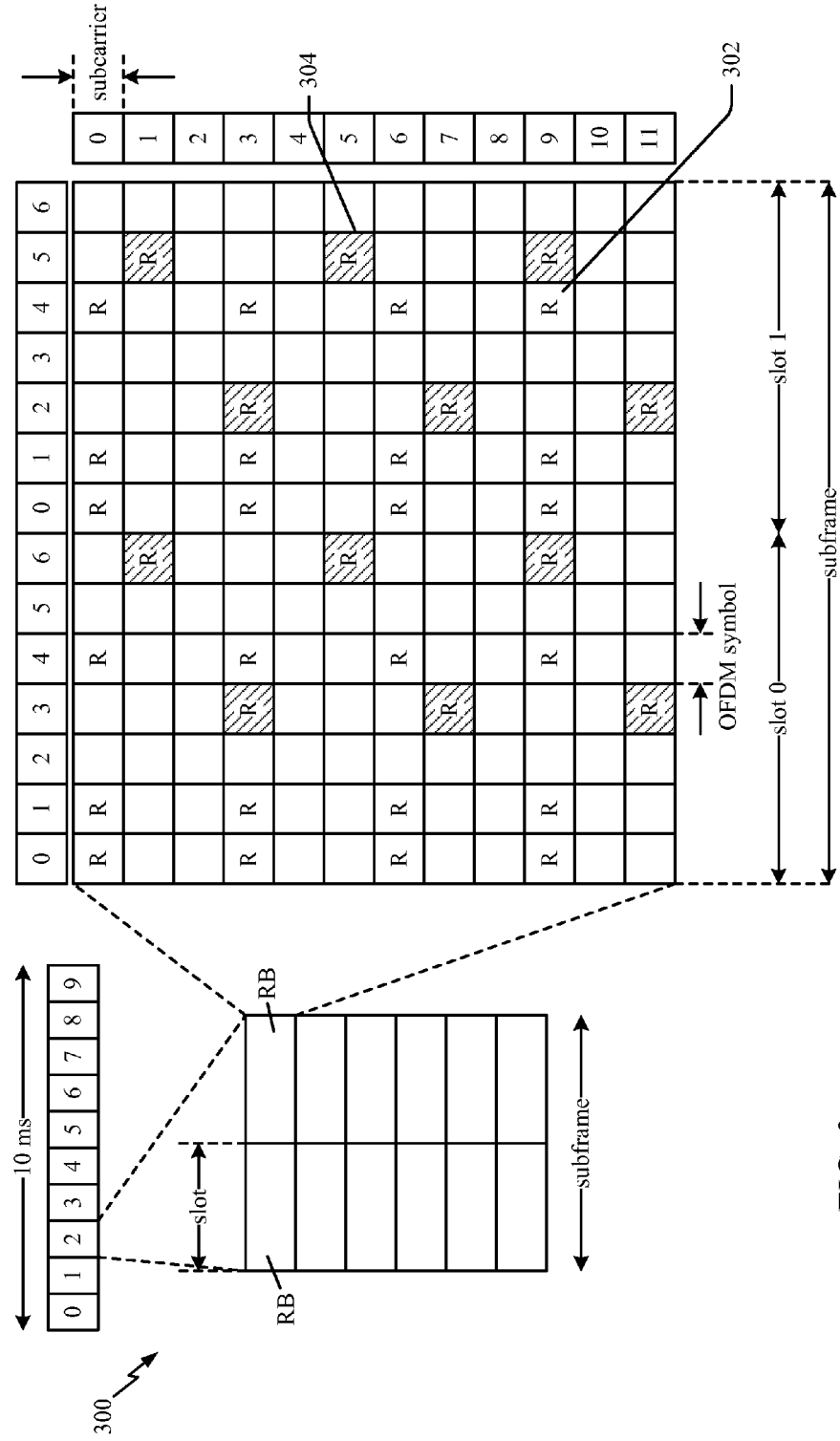
FIG. 3 is a diagram illustrating an example of a DL frame structure in LTE.

FIG. 3 is a diagram 300 illustrating an example of a DL frame structure in LTE, which may be used with the network architecture 100 shown in FIG. 1 and the access network 200 shown in FIG. 2. A frame (10 ms) may be divided into 10 equally sized sub-frames with indices of 0 through 9. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, R 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell served by the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH. In aspects of the present methods and apparatus, a subframe may include more than one PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 4:
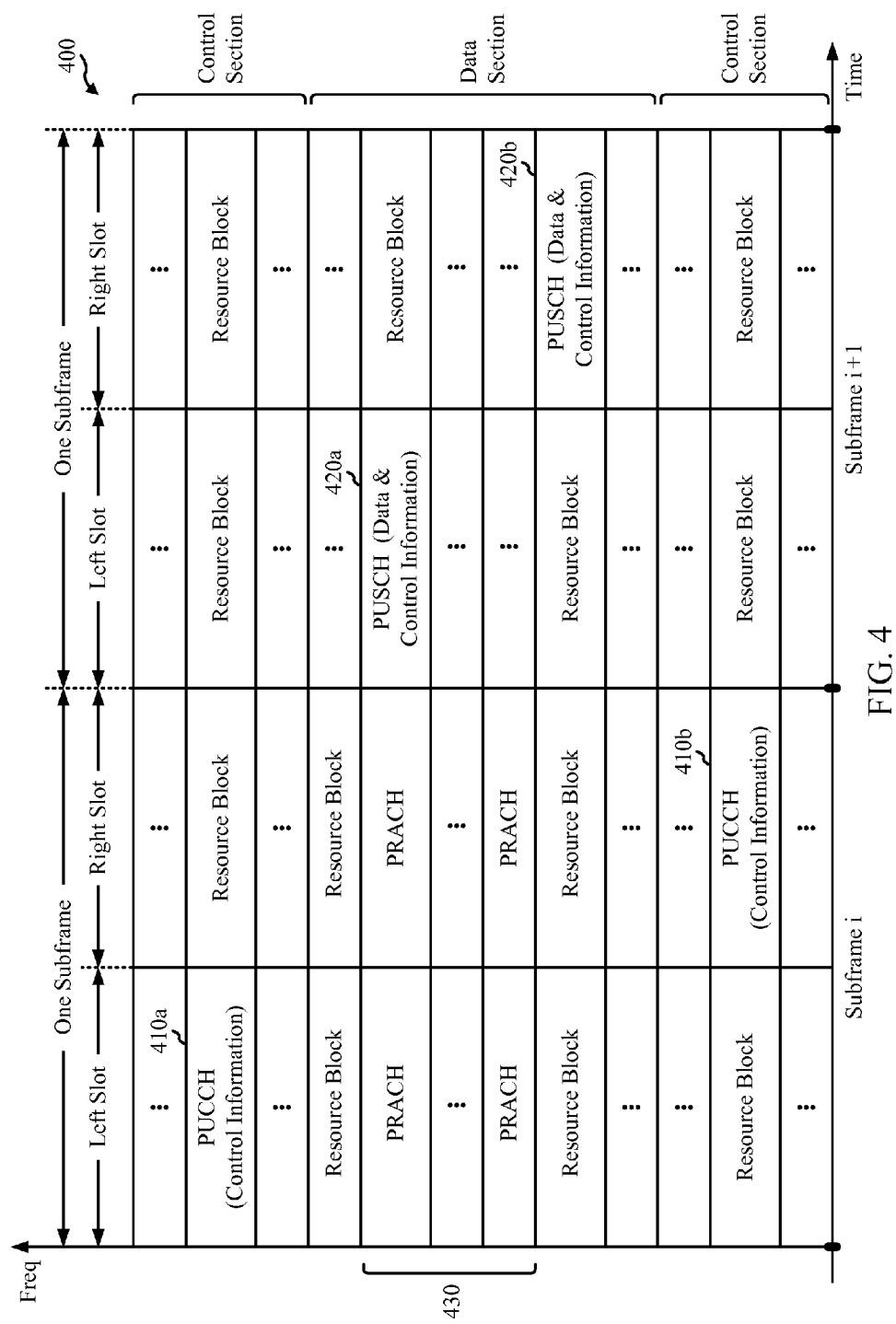
FIG. 4 is a diagram illustrating an example of an UL frame structure in LTE.

FIG. 4 is a diagram 400 illustrating an example of an UL frame structure in LTE. The exemplary UL frame structure may be used with the network architecture 100 shown in FIG. 1 and the access network 200 shown in FIG. 2. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB. The UE may also be assigned resource blocks 420*a*, 420*b* in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
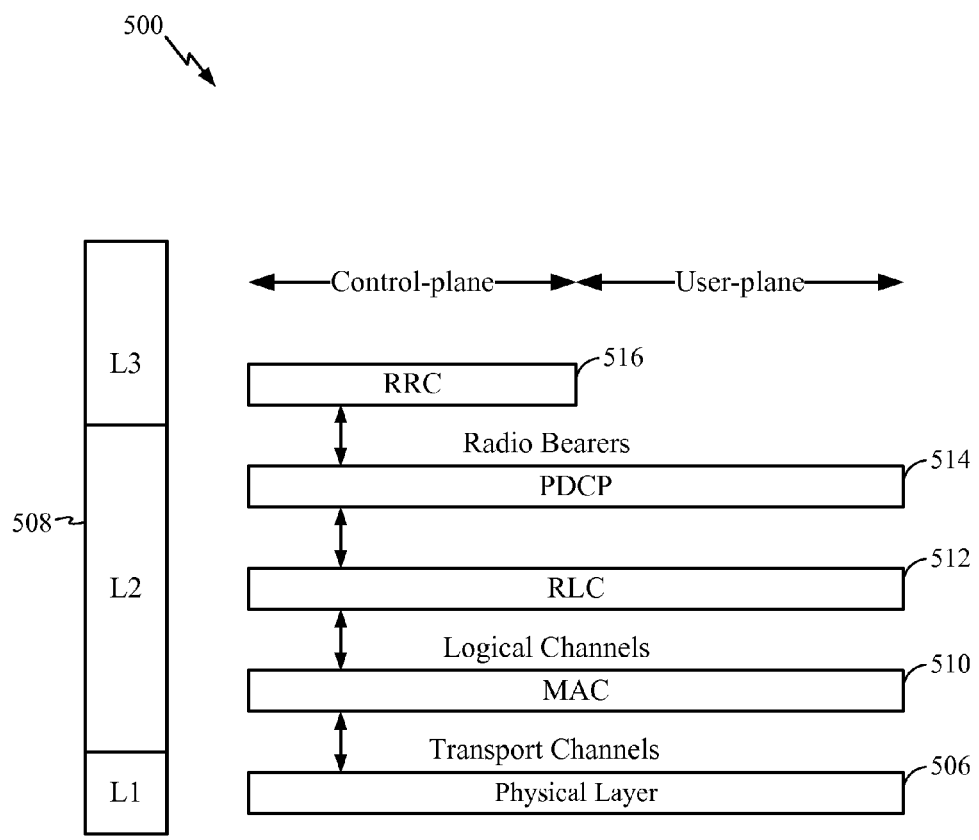
FIG. 5 is a diagram illustrating an example of a radio protocol architecture for the user and control plane.

FIG. 5 is a diagram 500 illustrating an example of a radio protocol architecture for the user and control planes in LTE. The illustrated radio protocol architecture may be used with the network architecture 100 shown in FIG. 1 and the access network 200 shown in FIG. 2. Data for wireless transmission by a device (e.g., a UE, an eNB) arrives from higher layers and is processed by the various layers as they pass the data down, until it is transmitted by the lowest layer, Layer 1 (L1) 506. Processing of the data may include dividing it into packets and adding error-checking information (e.g., checksums). Data is received (e.g., over radio waves) by L1, and passed up through and processed by the higher layers. Various sublayer functions, such as the RLC sublayer, may send acknowledgments (ACKs) of received data and accept ACKs of transmitted data. When a sublayer does not receive an ACK of transmitted data, the sublayer may trigger retransmission of the data. That is, the sublayer may send the same data (e.g., data packets) to lower layers to cause the lower layers to retransmit the data.

L1 is the lowest layer of the radio protocol architecture for the UE and the eNB and implements various physical layer signal processing functions. The L1 layer will be referred to herein as the physical layer (PHY). Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ) operations. The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
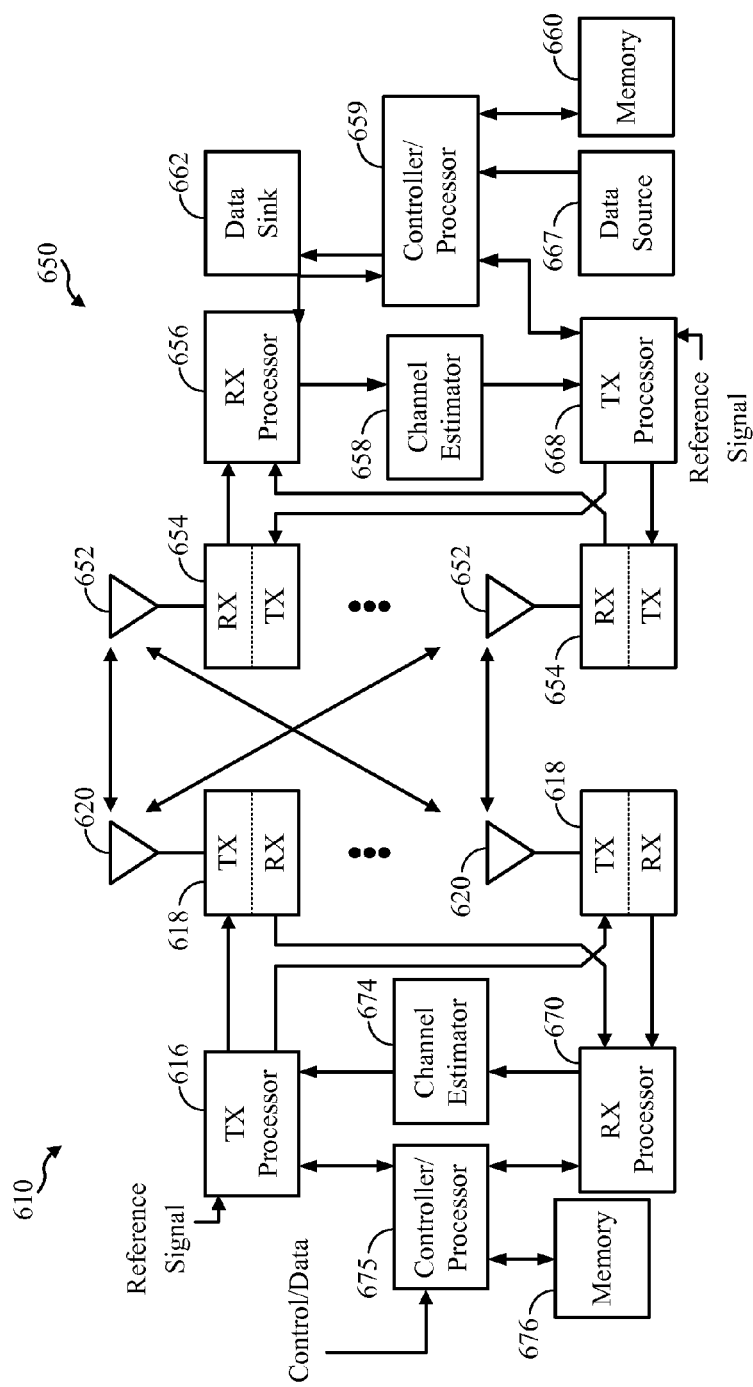
FIG. 6 is a diagram illustrating an example of an evolved Node B and user equipment in an access network, in accordance with certain aspects of the disclosure.

FIG. 6 is a block diagram of an eNB 610 in communication with a UE 650 in an access network. The access network may be similar to the access network 200 shown in FIG. 2, and may utilize the network architecture 100 shown in FIG. 1. Aspects of the present disclosure may be practiced in the UE 650. For example, the UE may be configured to delay UL RLC retransmissions, as described below with reference to FIG. 10 and FIG. 11.

In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 may perform or direct the UE in performing aspects of the present disclosure for delaying UL RLC retransmissions, such as the operations 1000 described below with reference to FIG. 10. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor 659 may perform or direct the UE in performing aspects of the present disclosure for delaying UL RLC retransmissions, such as the operations 1000 described below with reference to FIG. 10. The controller/processor can be associated with a memory 660 that stores program codes and data. The memory 660 may be referred to as a computer-readable medium. The memory 660 may store instructions for performing aspects of the present disclosure or directing the UE in performing aspects of the present disclosure, such as the operations 1000 described below with reference to FIG. 10. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations. The controllers/processors 675, 659 may direct the operation at the eNB 610 and the UE 650, respectively. The controller/processor 659 and/or other processors and modules at the UE 650 may perform or direct operations, for example operations 1000 in FIG. 10, and/or other processes for the techniques described herein, for example. In aspects, one or more of any of the components shown in FIG. 6 may be employed to perform example operations 1000 and/or other processes for the techniques (e.g., delaying UL RLC retransmissions) described herein.

Evolved Interference Management for Traffic Adaptation

Figure 8:
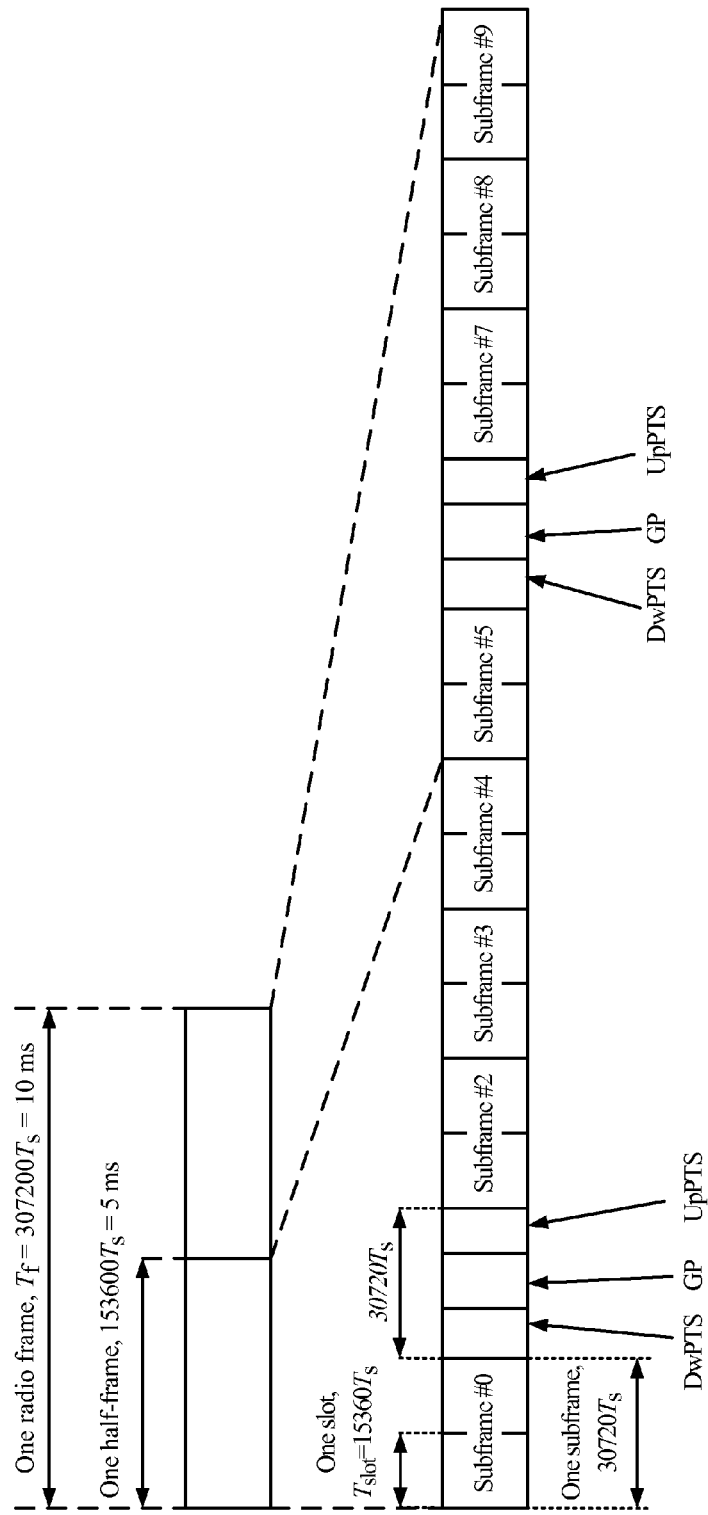
FIG. 8 illustrates an exemplary frame format.

In certain wireless communications networks, such as LTE networks, both Frequency Division Duplex (FDD) and (TDD) frame structures are supported. For TDD, 7 possible DL and UL subframe configurations are supported, for example, as shown in FIG. 7. It may be noted that there are 2 switching periodicities, 5 ms and 10 ms. For 5 ms switching periodicity, there are two special subframes in one frame (10 ms)—as illustrated in FIG. 8. For 10 ms switching periodicity, there is one special subframe in one frame. The present methods and apparatus may be employed when a larger or smaller number of subframe configurations are supported.

In LTE Rel-12, it is possible to dynamically adapt TDD DL/UL subframe configurations based on the actual traffic needs, also known as evolved interference management for traffic adaptation (eIMTA). For example, if, during a short duration, a large data burst on downlink is needed, the subframe configuration may be changed, for example, from configuration #1 (6 DL:4 UL) to configuration #5 (9 DL:1 UL). In some cases, the adaptation of TDD configuration is expected to be no slower than 640 ms. In an extreme case, the adaptation may be expected to be as fast as 10 ms.

In certain aspects, the adaptation, however, may cause overwhelming interference to both downlink and uplink when two or more cells have different downlink and uplink subframes. In addition, the adaptation may cause some complexity in DL and UL HARQ timing management. In certain aspects, each of the DL/UL subframe configurations has its own DL/UL HARQ timing. The DL/UL HARQ timing is optimized for each configuration (e.g., in terms of HARQ operation efficiency). For example, the timing from PDSCH to the corresponding ACK/NAK may be different for different TDD DL/UL subframe configurations (e.g., depending on when the next available uplink subframe occurs for sending the ACK/NAK).

For example, dynamic switching among the 7 configurations (or even more, if more flexible adaptation is deemed necessary) implies that if current DL/UL HARQ timing is kept, there may be missed ACK/NAK transmission opportunities for some of the DL or UL transmissions.

Delaying RLC Retransmissions

In current cellular technologies (e.g., Rel-8), UL RLC retransmissions are triggered at a UE when the serving network does not send an ACK/NAK for an UL protocol data unit (PDU) before the expiration of a T-poll retransmit timer that the UE starts when the UE completes a UL PDU transmission. When a UE operating in a CDRX mode transmits a UL PDU and cycles to an off-duration before the network transmits an RLC ACK of that UL PDU, then the network can ideally schedule an RLC ACK of that UL PDU only at the beginning of a next on-duration of the CDRX cycle. If the CDRX cycle length is longer than the UE's T-poll retransmit timer length, then the T-poll retransmit timer will expire before the UE switches its receiver on for the next CDRX on-duration. Because the radio link controller of the UE is typically unaware of CDRX cycles, RLC retransmissions by the UE can be triggered before the network attempts to send an RLC ACK. The triggering of the RLC retransmissions can cause the UE to wake up (e.g., activate one or more radio components) out of CDRX off-durations. This leads to unnecessary power consumption by the UE and negatively impacts battery performance of the UE.

In current cellular technologies, the first opportunity that a network is going to respond to a UL PDU with an ACK/NAK is at the first subframe of on-duration of the CDRX cycle. In networks operating with a TDD UL-heavy configuration and/or CDRX, a UE may retransmit a UL PDU even though there has been no DL subframe in which the network could send an ACK/NAK responding to the earlier transmission of the UL PDU. When these retransmissions fall during a CDRX off-duration, the UE may wake up solely for the retransmission, although the first ACK/NAK from the network is going to be scheduled during the first subframe of on-duration of the CDRX cycle.

Additionally or alternatively, during TDD UL heavy configurations (e.g., TDD configurations 0, 6), where there are a larger number of UL transmission opportunities than DL transmission opportunities, a UE may have to retransmit UL PDUs while waiting for an ACK/NAK from the network (e.g., due to the limited DL transmission opportunities associated with the TDD UL heavy configuration). This is more probable when the network is operating using eIMTA, due to the possibility of rapid changes in the TDD subframe configuration resulting in the network missing opportunities to transmit ACK/NAKs, as discussed above.

According to certain aspects of this disclosure, when an RLC retransmission falls during an off-duration (e.g., off-durations of a CDRX cycle) and a physical HARQ indicator channel (PHICH) ACK (HARQ ACK) of the UL transmission has already been received by the UE, the UE may wait until the next on-duration to perform an RLC retransmission, instead of retransmitting RLC PDUs immediately after expiration of a t-poll retransmit timer of the UE. Because HARQ functionality of the UE (e.g., the hardware and software responsible for performing HARQ in a UE) is aware of CDRX cycles, the HARQ ACK (PHICH ACK) may be used to determine how long to delay (e.g., prolong the time before starting) RLC retransmissions and thus, avoid unnecessary transmitter activations by the UE during CDRX off-durations.

According to certain aspects of this disclosure, a UE may avoid unnecessarily waking up or activating radio components during an off-duration (e.g., off-durations of a CDRX cycle), by delaying an RLC retransmission until the next available on-duration (e.g., on-duration of a CDRX cycle). According to additional or alternative aspects, in case of a network operating in a TDD UL heavy configuration, the RLC retransmission of the UE may be opportunistically delayed (e.g., based on a TDD DL/UL configuration currently in use). For example, the RLC retransmission of the UE may be delayed until after the first DL subframe after expiration of a t-poll retransmit timer of the UE (e.g., and possibly until after a PHICH ACK (HARQ ACK) of the UL transmission has been received by the UE).

Figure 9:
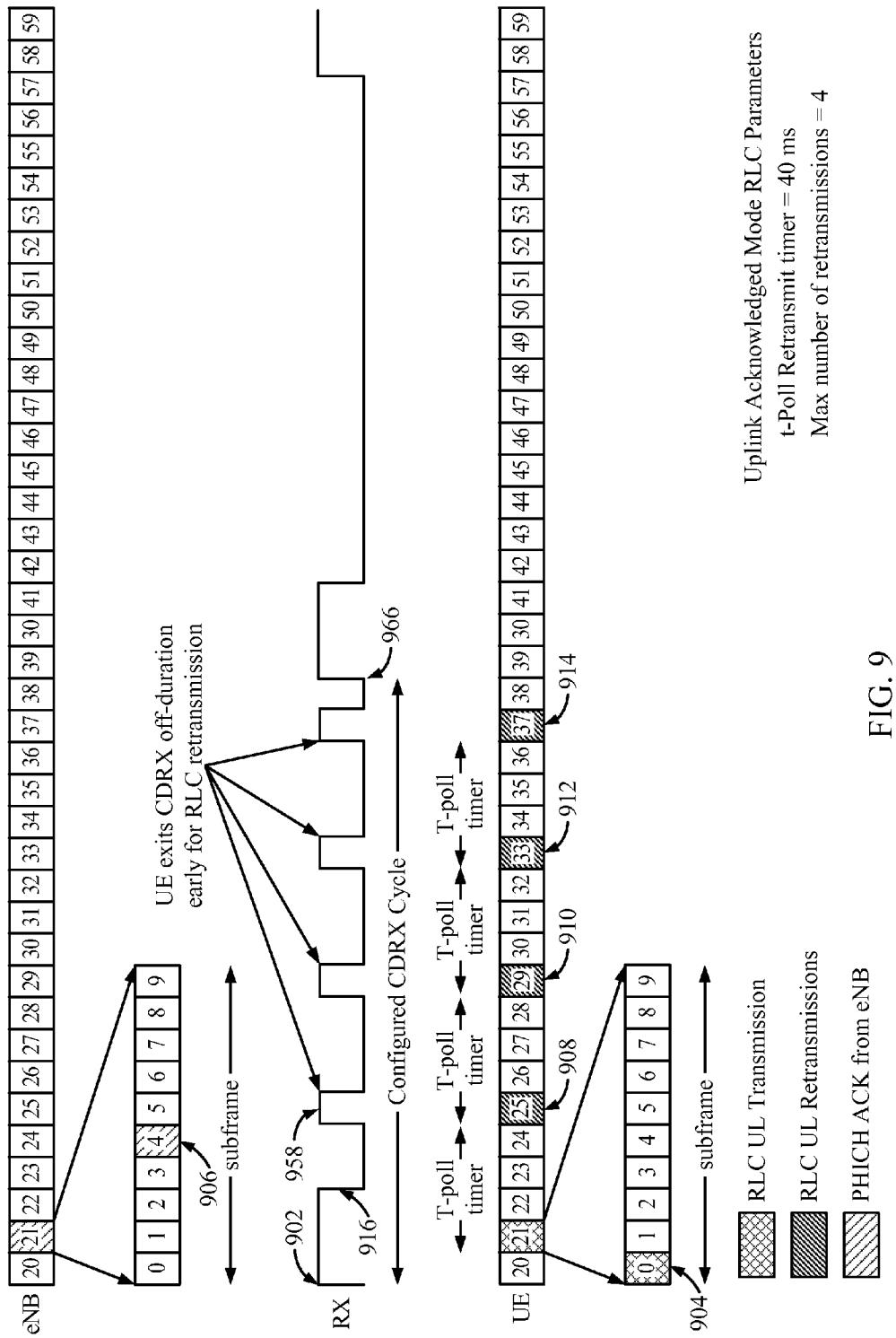
FIG. 9 illustrates an exemplary timeline of operations by a UE.

FIG. 9 illustrates an exemplary timeline of operations by a UE, without delaying RLC transmissions, which may result in unnecessary power consumption. The UE may be operating in the CDRX cycle illustrated at 902. At 904, the UE transmits UL data to the eNB during frame 21, subframe 0. The UE starts a t-poll retransmit timer after completing the UL data transmission. In the illustrated example, the UE's t-poll retransmit timer may be 40 milliseconds.

An eNB serving the UE sends a PHICH ACK of the UE's transmission, in this example, during frame 21, subframe 4, indicated at 906. When the UE reaches the end of the on-duration of the configured CDRX cycle at 916, the UE places a radio component RX (for example, a transceiver) of the UE into a low power state (e.g., deactivates the receiver). Because the network considers the UE to be scheduled in an off-duration of the CDRX cycle, the network does not send an RLC ACK/NAK for the UL transmission sent by the UE in frame 21 until the next CDRX on-duration, which starts at 966.

At 908, the UE's t-poll retransmit timer expires (e.g., reaches the end of 40 milliseconds since the UL transmission during frame 21). Because the UE has not received an RLC ACK/NAK from the eNB, the UE may exit the DRX off-duration early (indicated at 958) and enable a transceiver to retransmit the UL PDU (e.g., perform an RLC retransmission) during frame 25, subframe 0.

The UE may restart the T-poll retransmit timer after the transmission in frame 25 is completed. In addition to activating a transceiver to retransmit during frame 25, subframe 0, the UE may have to send a scheduling request (SR) during frame 24, subframe 2, for example. The UE may then receive a UL grant in frame 24, subframe 6, for example, from the eNB.

Again, because the network considers the UE to be scheduled in an off-duration of the CDRX cycle, the network does not send an RLC ACK/NAK for the UL transmission sent by the UE in frame 25. Similarly to 908, at 910, the UE may activate a transceiver and retransmit again during frame 29 when the UE's T-poll retransmit timer expires again (e.g., 40 ms after the first retransmission in frame 25, subframe 0). The UE may also activate a transceiver and retransmit at 912 and 914, up to a configured maximum number of retransmissions. Also similar to above, the UE may have to send an SR and receive a UL grant for each of the retransmissions.

Figure 10:
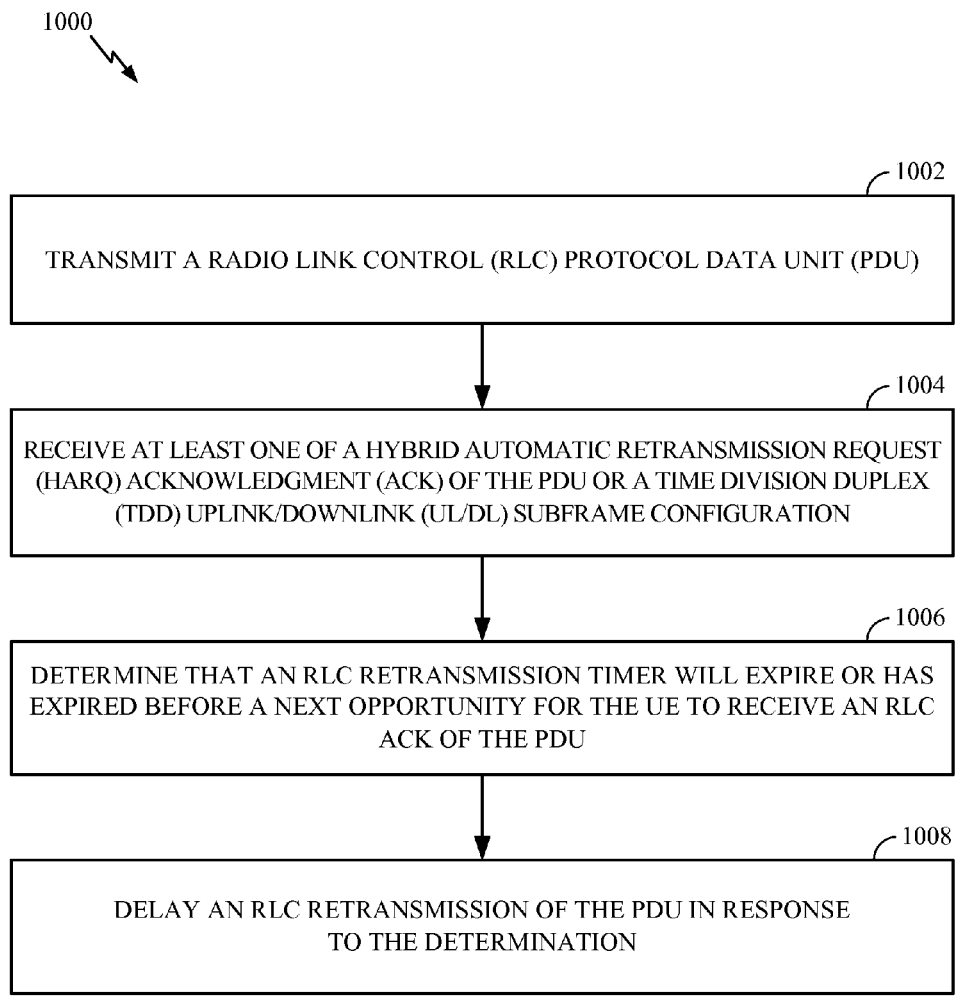
FIG. 10 illustrates example operations performed, for example, by a UE for delaying RLC retransmissions, in accordance with aspects of the disclosure.

FIG. 10 illustrates example operations 1000 for delaying RLC retransmissions, in accordance with aspects of the present disclosure. Operations 1000 may be performed, for example, by a UE and may help avoid the unnecessary RLC retransmissions during the DRX off-duration described above with reference to FIG. 9.

Operations 1000 may begin, at 1002, by the UE transmitting a radio link control (RLC) protocol data unit (PDU). At 1004, the UE may receive at least one of a hybrid automatic retransmission request (HARQ) acknowledgment (ACK) of the PDU or a time division duplex (TDD) uplink/downlink (UL/DL) subframe configuration. At 1006, the UE may determine that an RLC retransmission timer will expire or has expired before a next opportunity for the UE to receive an RLC ACK of the PDU. At 1008, the UE may delay an RLC retransmission of the PDU in response to the determination.

According to certain aspects of the present disclosure, the next opportunity for the UE to receive an RLC ACK of the PDU may comprise a next downlink (DL) subframe in a time division duplex (TDD) frame. That is, an eNB receiving an RLC PDU cannot transmit an RLC ACK until a next DL subframe in a TDD frame, and therefore the UE cannot receive the RLC ACK until the next DL subframe in a TDD frame.

According to certain aspects of the present disclosure, determining that an RLC retransmission timer will expire or has expired before a next opportunity for the UE to receive an RLC ACK of the PDU may include determining that an RLC retransmission timer will expire or has expired before a next opportunity for the UE to receive an RLC ACK of the PDU based on the TDD UL/DL configuration. That is, a UE may determine that an eNB receiving an RLC PDU cannot transmit an RLC ACK based on a planned TDD UL/DL configuration, which may not be a current TDD UL/DL configuration, and therefore the UE cannot receive the RLC ACK, based on the planned TDD UL/DL configuration.

Figure 11:
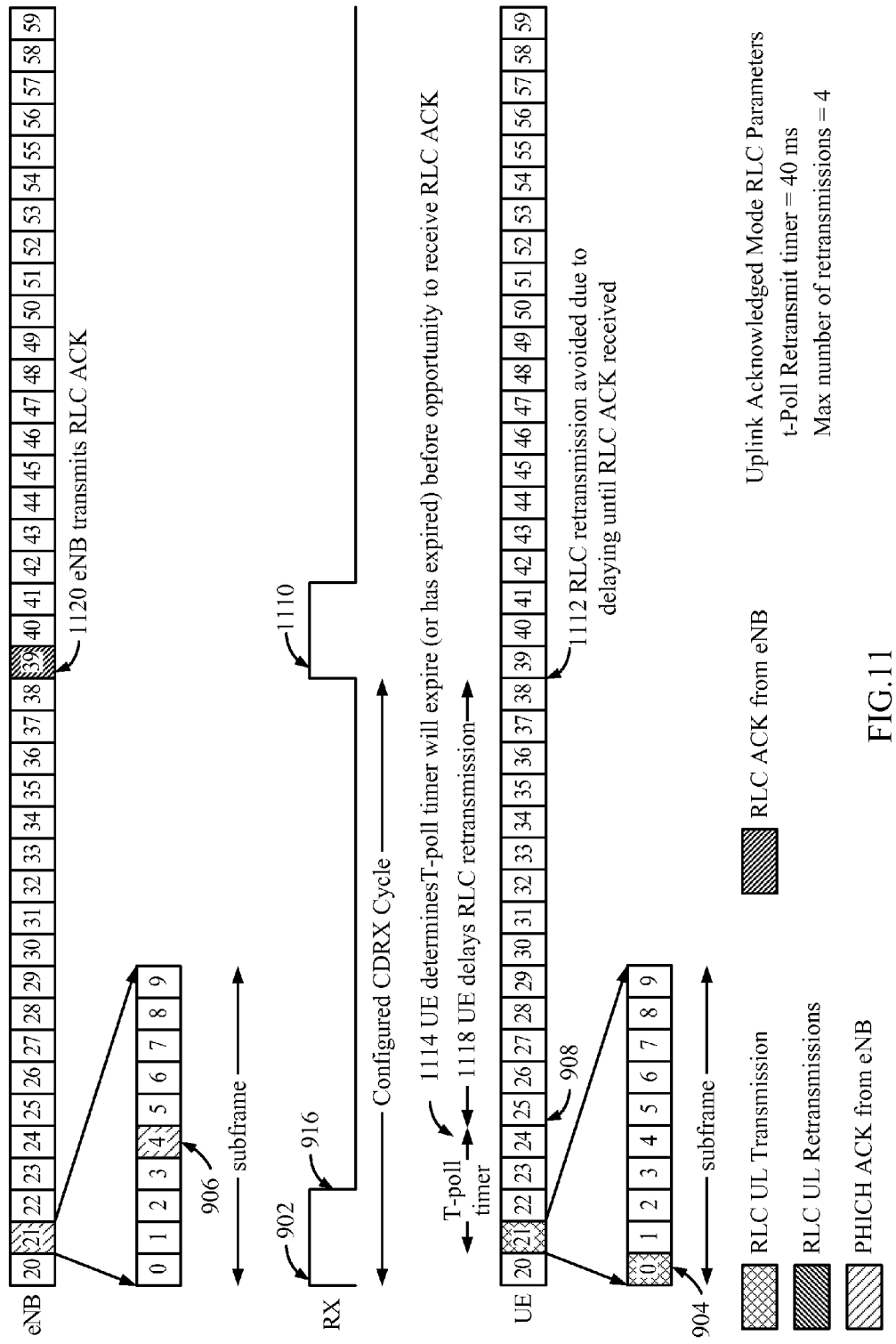
FIG. 11 illustrates an exemplary timeline of operations by a UE, according to aspects of the present disclosure.

FIG. 11 illustrates an exemplary timeline of operations by a UE that delays RLC retransmissions (e.g., by performing operations 1000 of FIG. 10), according to aspects of the present disclosure.

In contrast to the timeline shown in FIG. 9, the UE operating according to aspects of the present disclosure may avoid unnecessarily exiting the CDRX off-duration to perform RLC retransmissions, by delaying RLC retransmissions if there has been (or will be) no opportunity for the UE to receive an RLC ACK prior to an RLC retransmission timer expiring.

As in FIG. 9, the UE transmits UL data to the eNB at 904, and starts a t-poll retransmit timer after completing the UL data transmission. While the t-poll retransmit timer is running (or after it expires), the UE determines at 1114 that the t-poll retransmit timer will expire (or has expired) before the next opportunity to receive an RLC ACK for the UL transmission.

As in FIG. 9, the UE's t-poll retransmit timer expires at 908. But unlike in FIG. 9, because the UE has determined that the t-poll retransmission timer would expire (or has expired) before the UE had an opportunity to receive an RLC ACK for the UL transmission, at 1118 the UE delays the RLC retransmission until the UE has an opportunity to receive an RLC ACK/NAK, which the network sends at 1120.

Additionally or alternatively, when the t-poll retransmit timer expires at 908, the UE may determine that the timer expired before a next opportunity for the UE to receive an RLC ACL/NAK, and delay the RLC retransmission based on this determination. The delaying by the UE allows the UE to keep the radio component RX (e.g., a transceiver) in the low power state for the off-duration of the configured CDRX cycle.

In either case, at 1112, the UE receives the RLC ACK/NAK from the eNB, and determines, in the case of an ACK, that the UE will not retransmit the UL data. That is, if the UE receives an RLC ACK of the PDU, the UE avoids sending the RLC retransmission. Of course, in the case of a NAK from the eNB, the UE may still retransmit the UL data.

According to aspects of the present disclosure, by delaying RLC retransmissions, a UE may avoid unnecessarily waking up (e.g., activating radio components) during frame 28, subframe 2; frame 32, subframe 2; and frame 36, subframe 2, for example, as compared to the UE operating according to the exemplary timeline in FIG. 9.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

Moreover, the term "or" is intended to mean an inclusive "or" rather than an exclusive "or." That is, unless specified otherwise or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members. As an example, "at least one of: a, b, or c" is intended to cover: a, b, c, a-b, a-c, b-c, and a-b-c.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications performed by a user equipment (UE), comprising:
   transmitting a radio link control (RLC) protocol data unit (PDU);
   receiving at least one of a hybrid automatic retransmission request (HARQ) acknowledgment (ACK) of the PDU or a time division duplex (TDD) uplink/downlink (UL/DL) subframe configuration;
   determining that an RLC retransmission timer will expire or has expired before a next opportunity for the UE to receive an RLC ACK of the PDU; and
   delaying, at least until the next opportunity for the UE to receive an RLC ACK of the PDU, an RLC retransmission of the PDU in response to the determination.

2. The method of claim 1, wherein the delaying comprises:
   transmitting the RLC retransmission if an RLC ACK of the PDU is not received during the next opportunity for the UE to receive an RLC ACK of the PDU.

3. The method of claim 1, further comprising:
   receiving an RLC ACK of the PDU; and
   refraining from transmitting the RLC retransmission in response to receiving the RLC ACK.

4. The method of claim 1, wherein the next opportunity for the UE to receive an RLC ACK of the PDU comprises a next downlink (DL) subframe in a time division duplex (TDD) frame.

5. The method of claim 1, wherein determining that an RLC retransmission timer will expire or has expired before a next opportunity for the UE to receive an RLC ACK of the PDU includes determining that an RLC retransmission timer will expire or has expired before a next opportunity for the UE to receive an RLC ACK of the PDU based on the TDD UL/DL subframe configuration.

6. The method of claim 1, wherein the next opportunity for the UE to receive an RLC ACK of the PDU comprises a next subframe in which the UE is active in a discontinuous reception (DRX) cycle.

7. The method of claim 6, wherein the UE deactivates at least one radio component while the UE is inactive in the DRX cycle.

8. An apparatus for wireless communications by a user equipment (UE), comprising:
   a processor configured to:
      transmit a radio link control (RLC) protocol data unit (PDU);
      receive at least one of a hybrid automatic retransmission request (HARQ) acknowledgment (ACK) of the PDU or a time division duplex (TDD) uplink/downlink (UL/DL) subframe configuration;
      determine that an RLC retransmission timer will expire or has expired before a next opportunity for the apparatus to receive an RLC ACK of the PDU; and delay, at least until the next opportunity for the UE to receive an RLC ACK of the PDU, an RLC retransmission of the PDU in response to the determination; and a memory coupled to the processor.

9. The apparatus of claim 8, wherein the processor is configured to:
transmit the RLC retransmission if an RLC ACK of the PDU is not received during the next opportunity for the UE to receive an RLC ACK of the PDU.

10. The apparatus of claim 8, wherein the processor is configured to:
receive an RLC ACK of the PDU; and
refrain from transmitting the RLC retransmission in response to receiving the RLC ACK.

11. The apparatus of claim 8, wherein the next opportunity for the apparatus to receive an RLC ACK of the PDU comprises a next downlink (DL) subframe in a time division duplex (TDD) frame.

12. The apparatus of claim 8, wherein the processor is configured to:
determine that an RLC retransmission timer will expire or has expired before a next opportunity for the apparatus to receive an RLC ACK of the PDU based on the TDD UL/DL subframe configuration.

13. The apparatus of claim 8, wherein the next opportunity for the apparatus to receive an RLC ACK of the PDU comprises a next subframe in which the apparatus is active in a discontinuous reception (DRX) cycle.

14. The apparatus of claim 13, wherein the processor is configured to:
deactivate at least one radio component of the apparatus while the apparatus is inactive in the DRX cycle.

15. An apparatus for wireless communications, comprising:
means for transmitting a radio link control (RLC) protocol data unit (PDU);
means for receiving at least one of a hybrid automatic retransmission request (HARQ) acknowledgment (ACK) of the PDU or a time division duplex (TDD) uplink/downlink (UL/DL) subframe configuration;
means for determining that an RLC retransmission timer will expire or has expired before a next opportunity for the apparatus to receive an RLC ACK of the PDU; and
means for delaying, at least until the next opportunity for the apparatus to receive an RLC ACK of the PDU, an RLC retransmission of the PDU in response to the determination.

16. The apparatus of claim 15, wherein the means for delaying comprises:
means for transmitting the RLC retransmission if an RLC ACK of the PDU is not received during the next opportunity for the apparatus to receive an RLC ACK of the PDU.

17. The apparatus of claim 15, further comprising:
means for receiving an RLC ACK of the PDU; and
means for refraining from transmitting the RLC retransmission in response to receiving the RLC ACK.

18. The apparatus of claim 15, wherein the next opportunity for the apparatus to receive an RLC ACK of the PDU comprises a next downlink (DL) subframe in a time division duplex (TDD) frame.

19. The apparatus of claim 15, wherein the means for determining that an RLC retransmission timer will expire or has expired before a next opportunity for the apparatus to receive an RLC ACK of the PDU includes means for determining that an RLC retransmission timer will expire or has expired before a next opportunity for the apparatus to receive an RLC ACK of the PDU based on the TDD UL/DL subframe configuration.

20. The apparatus of claim 15, wherein the next opportunity for the apparatus to receive an RLC ACK of the PDU comprises a next subframe in which the apparatus is active in a discontinuous reception (DRX) cycle.

21. The apparatus of claim 20, further comprising:
means for deactivating at least one radio component of the apparatus while the apparatus is inactive in the DRX cycle.

22. A non-transitory computer readable medium storing computer executable code for wireless communications by a user equipment (UE), comprising:
code for transmitting a radio link control (RLC) protocol data unit (PDU);
code for receiving at least one of a hybrid automatic retransmission request (HARQ) acknowledgment (ACK) of the PDU or a time division duplex (TDD) uplink/downlink (UL/DL) subframe configuration;
code for determining that an RLC retransmission timer will expire or has expired before a next opportunity to receive an RLC ACK of the PDU; and
code for delaying, at least until the next opportunity for the UE to receive an RLC ACK of the PDU, an RLC retransmission of the PDU in response to the determination.

23. The computer readable medium of claim 22, wherein the code for delaying comprises:
code for transmitting the RLC retransmission if an RLC ACK of the PDU is not received during the next opportunity for the UE to receive an RLC ACK of the PDU.

24. The computer readable medium of claim 22, further comprising:
code for receiving an RLC ACK of the PDU; and
code for refraining from transmitting the RLC retransmission in response to receiving the RLC ACK.

25. The computer readable medium of claim 22, wherein the next opportunity to receive an RLC ACK of the PDU comprises a next downlink (DL) subframe in a time division duplex (TDD) frame.

26. The computer readable medium of claim 22, wherein the code for determining that an RLC retransmission timer will expire or has expired before a next opportunity to receive an RLC ACK of the PDU includes code for determining that an RLC retransmission timer will expire or has expired before a next opportunity to receive an RLC ACK of the PDU based on the TDD UL/DL subframe configuration.

27. The computer readable medium of claim 22, wherein the next opportunity to receive an RLC ACK of the PDU comprises a next subframe in which an apparatus is active in a discontinuous reception (DRX) cycle.

28. The computer readable medium of claim 27, further comprising:
code for deactivating at least one radio component of the apparatus while the apparatus is inactive in the DRX cycle.

* * * * *